(12) United States Patent
Goggans

(10) Patent No.: US 11,473,041 B1
(45) Date of Patent: Oct. 18, 2022

(54) METHOD FOR AGING BOTTLED WINE

(71) Applicant: Eric P Goggans, Citrus Heights, CA (US)

(72) Inventor: Eric P Goggans, Citrus Heights, CA (US)

(*) Notice: Subject to any disclaimer, the term of this patent is extended or adjusted under 35 U.S.C. 154(b) by 409 days.

(21) Appl. No.: 16/712,675

(22) Filed: Dec. 12, 2019

Related U.S. Application Data

(60) Provisional application No. 62/785,122, filed on Dec. 26, 2018.

(51) Int. Cl.
*C12H 1/22* (2006.01)
*B67B 7/04* (2006.01)

(52) U.S. Cl.
CPC .............. *C12H 1/22* (2013.01); *B67B 7/04* (2013.01)

(58) Field of Classification Search
CPC ............ C12H 1/00; C12H 1/06; C12H 1/061;
C12H 1/063; C12H 1/16; C12H 1/165;
C12H 1/22; C12G 1/00; C12G 1/062;
C12G 3/00; C12G 3/02; C12G 3/021;
C12G 3/022; C12G 3/023; C12G 3/024;
C12G 3/06; C12G 3/07; C12G 3/08
USPC ................................................. 426/590, 592
See application file for complete search history.

(56) References Cited

U.S. PATENT DOCUMENTS

2011/0143000 A1* 6/2011 Fiset ..................... C12H 1/165
426/248

FOREIGN PATENT DOCUMENTS

CN 106675983 A * 5/2017 .......... C12H 1/0416

* cited by examiner

*Primary Examiner* — Vera Stulii
(74) *Attorney, Agent, or Firm* — Plager Schack LLP; Mark H. Plager; Kara Verryt

(57) ABSTRACT

A method for rapidly aging a beverage in dry conditions may include removing a cork covering from a bottle plugged with a cork, wherein the bottle houses a volume of the beverage; applying a spring return device to the cork to prevent the cork from pushing into the bottle during aging; placing the bottle into a bag and sealing the bag; placing the bagged bottle into a pressure vessel; pressurizing the pressure vessel and allowing the bagged bottle to age within the pressure vessel for a desired period of time; depressurizing the pressure vessel; and removing the bottle from the pressure vessel and from the bag.

9 Claims, 1 Drawing Sheet

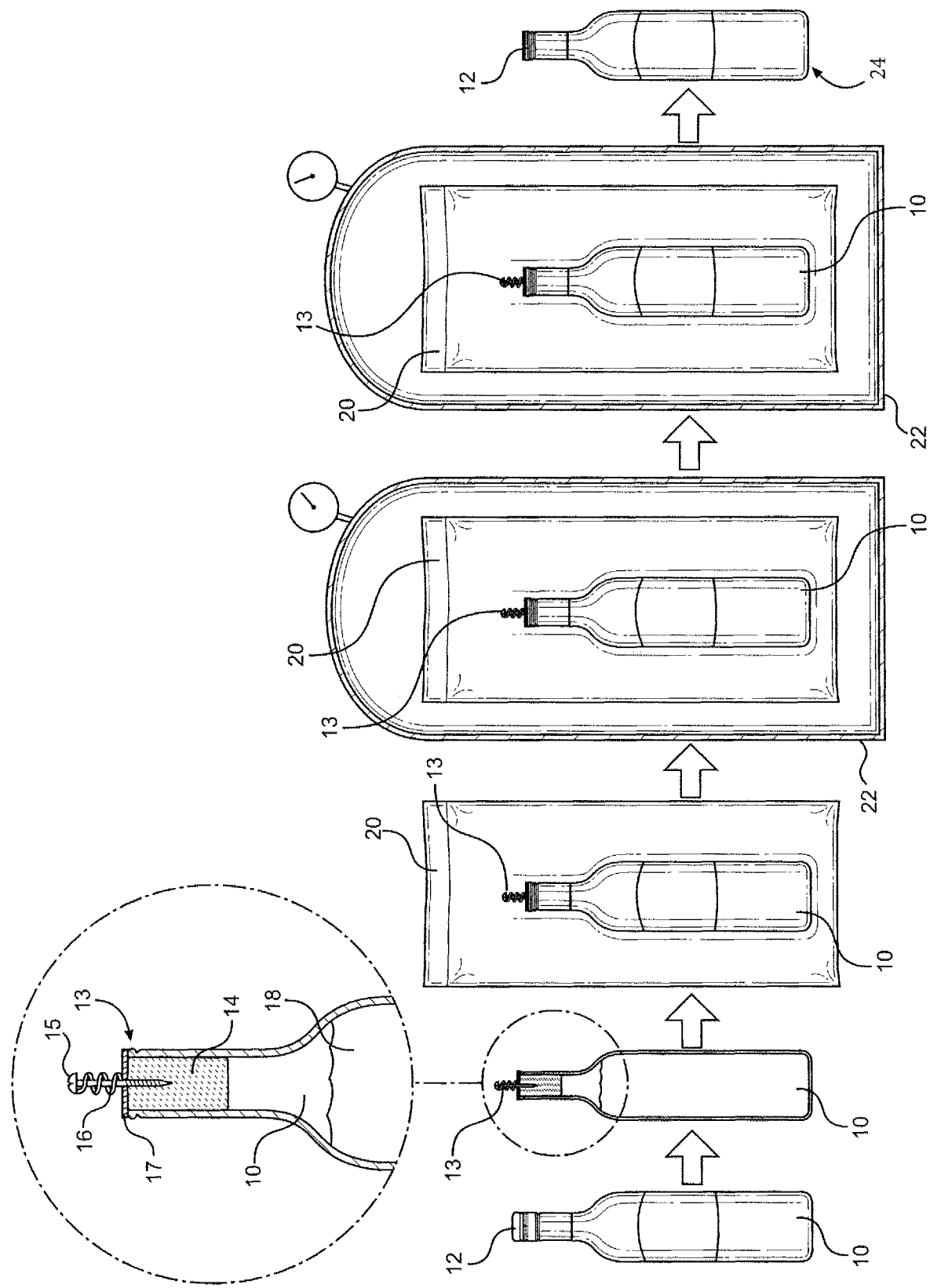

METHOD FOR AGING BOTTLED WINE

RELATED APPLICATION

This application claims priority to provisional patent application U.S. Ser. No. 62/785,122 filed on Dec. 26, 2018, the entire contents of which is herein incorporated by reference.

BACKGROUND

The embodiments described herein relate generally to aging beverages, and more particularly, to a method for rapidly aging bottled wine.

Wine takes several years to reach peak maturity by aging in the bottle. This delay is expensive due to storage costs, and it prevents the consumer from enjoying their wine sooner. Some other aging methods include maturing wine in bulk, rather than in finished bottles, and sometimes with wood chips. In another method wine bottles may be inserted into the ocean, at depth, to age the bottled wine. These conditions can lead to wine adulteration with seawater, contaminants, and microorganisms. Additionally, the United States government has mandated that wine aged in and coming directly from the sea or ocean is not allowed to be sold, as it could be contaminated. So, while the aging underwater methods may be suitable in other countries, these methods are not allowed in the United States for wine for resale.

Therefore, what is needed is a method for rapidly and safely aging bottled wine in dry conditions.

SUMMARY

Some embodiments of the present disclosure include a method for rapidly aging a beverage, such as wine, in dry conditions. The method may include removing a cork covering from a bottle plugged with a cork, wherein the bottle houses a volume of the beverage; applying a spring return device to the cork to prevent the cork from pushing into the bottle during aging; placing the bottle into a modified atmosphere (MAP) bag and sealing the bag; placing the bagged bottle into a pressure vessel; pressurizing the pressure vessel and allowing the bagged bottle to age within the pressure vessel for a desired period of time; depressurizing the pressure vessel; and removing the bottle from the pressure vessel and from the bag.

BRIEF DESCRIPTION OF THE FIGURES

The detailed description of some embodiments of the invention is made below with reference to the accompanying FIGURE, wherein like numerals represent corresponding parts of the FIGURE.

FIGURE is a diagram view of the method and components of an embodiment of the present disclosure.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The method of the present disclosure may be used to rapidly age bottled wine in dry conditions and may comprise the following elements. This list of possible constituent elements is intended to be exemplary only, and it is not intended that this list be used to limit the method of the present application to just these elements. Persons having ordinary skill in the art relevant to the present disclosure may understand there to be equivalent elements that may be substituted within the present disclosure without changing the essential function or operation of the method.

a. Bottled Wine
   b. Spring Return Device
   c. Low Oxygen Bag
   d. Pressurized Vessel The various elements of the present disclosure may be related in the following exemplary fashion. It is not intended to limit the scope or nature of the relationships between the various elements and the following examples are presented as illustrative examples only.

By way of example, and referring to FIGURE, some embodiments of the invention include a method for rapidly aging wine in dry conditions, the method comprising removing a cork covering (capsule) 12 from a bottle 10 plugged with a cork 14, wherein the bottle 10 is housing a beverage 18; applying a spring return device 13 to the cork 14 to prevent the cork 14 from pushing into the bottle 10 during aging; placing the bottle 10 into a bag 20, such as a low oxygen bag, and sealing the bag 20; placing the bagged bottle into a pressure vessel 22, such as a temperature controlled pressure vessel; pressurizing the pressure vessel 22 and allowing the bagged bottle to age within the pressure vessel 22 for a desired or predetermined period of time; depressurizing the pressure vessel 22; removing the bottle 10 from the pressure vessel 22 and from the bag 20; removing the spring return device 13 from the cork 14; and reapplying the cork covering 12 to the cork 14. Under pressure, beverage aging, such as wine aging, reactions are accelerated, and the low oxygen environment of the bag 20 prevents oxidative spoilage in the product. Thus, when the method of the present disclosure is used a beverage 18, such as wine, may be aged at a rate of at least about 10 times the natural aging rate. For example, following the method of the present disclosure, wine may be aged the equivalent of 30 months in only 90 days.

As shown in FIGURE, the spring return device 13 may comprise a screw 15 with a spring 16 surrounding a portion of the screw 15 proximate to the screw head. An end of the screw 16 distal from the screw head may comprise threads. A washer 17 may be placed on top of the top surface of the neck of the bottle and the top of the cork 14, and the screw 15 may be screwed through the washer 17 and into the cork 14, wherein the spring 16 may be positioned between the washer 17 and the screw head. As the beverage 18 is pressurized, the air pocket between the top surface of the beverage 18 and the bottom surface of the cork 14 may compress in size, causing the spring return device 13 to compress, thus preventing the cork 14 from entering the bottle 10 and breaking the seal. As such, even when the bottle 10 is placed in a pressurized vessel 22, the spring return device 13 prevents the cork 14 from pushing into the bottle 10. When depressurizing, the spring return device 13 puts the cork 14 back into its original position in the neck of the bottle 10, as the air pocket in the bottle 10 returns to its original size.

As described above, after the spring return device 13 is applied to the cork 14, the bottle 10 may be placed into and sealed within a bag 20, such as a low-oxygen atmosphere (MAP) plastic bag, wherein low-oxygen is defined as a gas blend comprising oxygen and at least one other gas, and the oxygen is present at a lower percentage than the at least one other gas. For example, the low-oxygen atmosphere may comprise at least 90% non-oxidizing gas with the balance being oxygen. The bag 20 with the bottle 10 sealed therein may then be placed into the pressure vessel 22, and the vessel 22 may be slowly pressurized. For example, the pressure vessel 22 may be pressurized over an 8 hour period and maintained at a pressure of from about 50 to about 150 PSI for the desired period of time, such as a period of about 3 months. The temperature within the pressure vessel 22 may be maintained at a desired temperature, such as at about 60° F., wherein about 60° F. may be 60±8° F. Once the desired amount of time, such as about 3 months, has passed, the pressure in the pressure vessel 22 may be relieved by, for example, linearly depressurizing the vessel 22 over the course of about 8 hours or until the bottle 10 is back at atmospheric pressure. The spring return device 13 may then be removed from the cork 14 may simply unscrewing the screw 15 and removing the screw 15, spring 16, and washer 17 from the cork 14 and bottle 10, and the cork covering 12 may be replaced. An aged bottled beverage 24 may be the end result.

While the method described above mentions aging wine, the method may be used to age other beverages and comestibles, as desired.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for rapidly aging wine in dry conditions, the method comprising:
   removing a cork covering from a bottle plugged with a cork, wherein the bottle houses a volume of the wine;
   applying a spring return device to the cork to prevent the cork from pushing into the bottle during aging;
   placing the bottle into a bag and sealing the bag;
   placing the bagged bottle into a pressure vessel;
   pressurizing the pressure vessel and allowing the bagged bottle to age within the pressure vessel for a desired period of time;
   depressurizing the pressure vessel; and
   removing the bottle from the pressure vessel and from the bag.

2. The method of claim 1, further comprising:
   removing the spring return device from the cork; and
   reapplying the cork covering to the bottle.

3. The method of claim 1, wherein the bag is a low oxygen atmosphere plastic bag.

4. The method of claim 1, wherein the pressure vessel is a temperature controlled pressure vessel.

5. The method of claim 4, wherein a temperature inside the pressure vessel is maintained at a temperature of 60° F.±8° F.

6. The method of claim 4, wherein the pressure vessel is pressurized to a pressure of from about 50 to about 150 PSI.

7. The method of claim 1, wherein the desired period of time is at least 90 days.

8. The method of claim 1, wherein both pressurizing and depressurizing the pressure vessel occurs over a time period of about 8 hours.

9. The method of claim 1, wherein the spring return device comprises:
   a screw with a screw head and a threaded end distal from the screw head;
   a spring surrounding a portion of the screw proximate to the screw head;
   a washer designed to be placed on a top surface of a neck of the bottle and the top of the cork, wherein the screw passes through the washer into the cork during use.

* * * * *